(12) United States Patent
Lee et al.

(10) Patent No.: US 10,915,295 B2
(45) Date of Patent: Feb. 9, 2021

(54) AUTOMATED GENERATION OF AUDIO DAILY ACTIVITY OVERVIEW POWERED BY A DATABASE

(71) Applicant: salesforce.com, inc., San Francisco, CA (US)

(72) Inventors: Amy Catherine Lee, San Mateo, CA (US); Joseph Andolina, Castro Valley, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 16/002,535

(22) Filed: Jun. 7, 2018

(65) Prior Publication Data
US 2019/0377543 A1 Dec. 12, 2019

(51) Int. Cl.
*G06F 17/00* (2019.01)
*G06F 3/16* (2006.01)
*G06F 3/0484* (2013.01)
*G10L 15/26* (2006.01)

(52) U.S. Cl.
CPC ............ *G06F 3/167* (2013.01); *G06F 3/0484* (2013.01); *G10L 15/26* (2013.01)

(58) Field of Classification Search
CPC ....... G06F 3/167; G06F 3/0484; G10L 15/265
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Joseph Saunders, Jr.
(74) *Attorney, Agent, or Firm* — LKGlobal | Lorenz & Kopf, LLP

(57) ABSTRACT

Computer implemented methods and systems are provided for generating podcast files. In one embodiment, a method includes storing, in a template database, a podcast template, wherein the podcast template includes a sentence definition including one or more data tags and a sentence order for a plurality of sentences; storing, in a user database, user information for a plurality of users; generating, by a processor, a podcast text file by selectively populating the podcast template with user information associated with a first user of the plurality of users based on the data tags; converting, by the processor, the podcast text file to a podcast audio file; and storing, by the processor, the podcast text file and the podcast audio file in a podcast database for podcast playback by the first user.

16 Claims, 9 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,229,937 B2 * | 7/2012 | Kiefer .................. G10L 13/00 707/756 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,175,933 B1 * | 1/2019 | Wagner .................. G06F 3/167 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0214485 A1 * | 9/2007 | Bodin .................. G06F 16/9577 725/101 |
| 2008/0133591 A1 * | 6/2008 | Bookman ............ G06F 17/2735 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0153113 A1 * | 6/2010 | Kiefer .................. G06Q 10/06 704/258 |
| 2010/0332115 A1 * | 12/2010 | Erhardt .................. G01C 21/20 701/532 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0231931 A1 * | 9/2013 | Kulis ..................... G06F 3/167 704/235 |
| 2013/0247216 A1 | 9/2013 | Cinarkaya et al. |
| 2014/0006556 A1 * | 1/2014 | Shapiro ............ H04L 21/25891 709/217 |
| 2015/0188967 A1 * | 7/2015 | Paulauskas ........... H04L 67/306 709/219 |
| 2017/0169853 A1 * | 6/2017 | Hu ....................... H04N 21/233 |

\* cited by examiner

AUTOMATED GENERATION OF AUDIO DAILY ACTIVITY OVERVIEW POWERED BY A DATABASE

TECHNICAL FIELD

Embodiments of the subject matter described herein relate generally to podcast systems, and more particularly to techniques for automating personalized podcasts in a podcast system.

BACKGROUND

A podcast is a series of digital audio or video files that are stored by a database. The podcasts can be downloaded and listened to by a user via a web or mobile application. Podcasts generally include episodes of thematically related literary works such as, books, television shows, radio shows, political shows, etc. Some podcasts include guides or a tour for an attraction. Regardless of the type of podcast, the content of the podcast is typically the same for all users. That is, the content that one user listens to is the same as the content that another user listens to. In some instances, it would be desirable to personalize the content of the podcast for each user.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Disclosed herein are systems and methods for providing personalized podcasts to one or more users of a system. The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
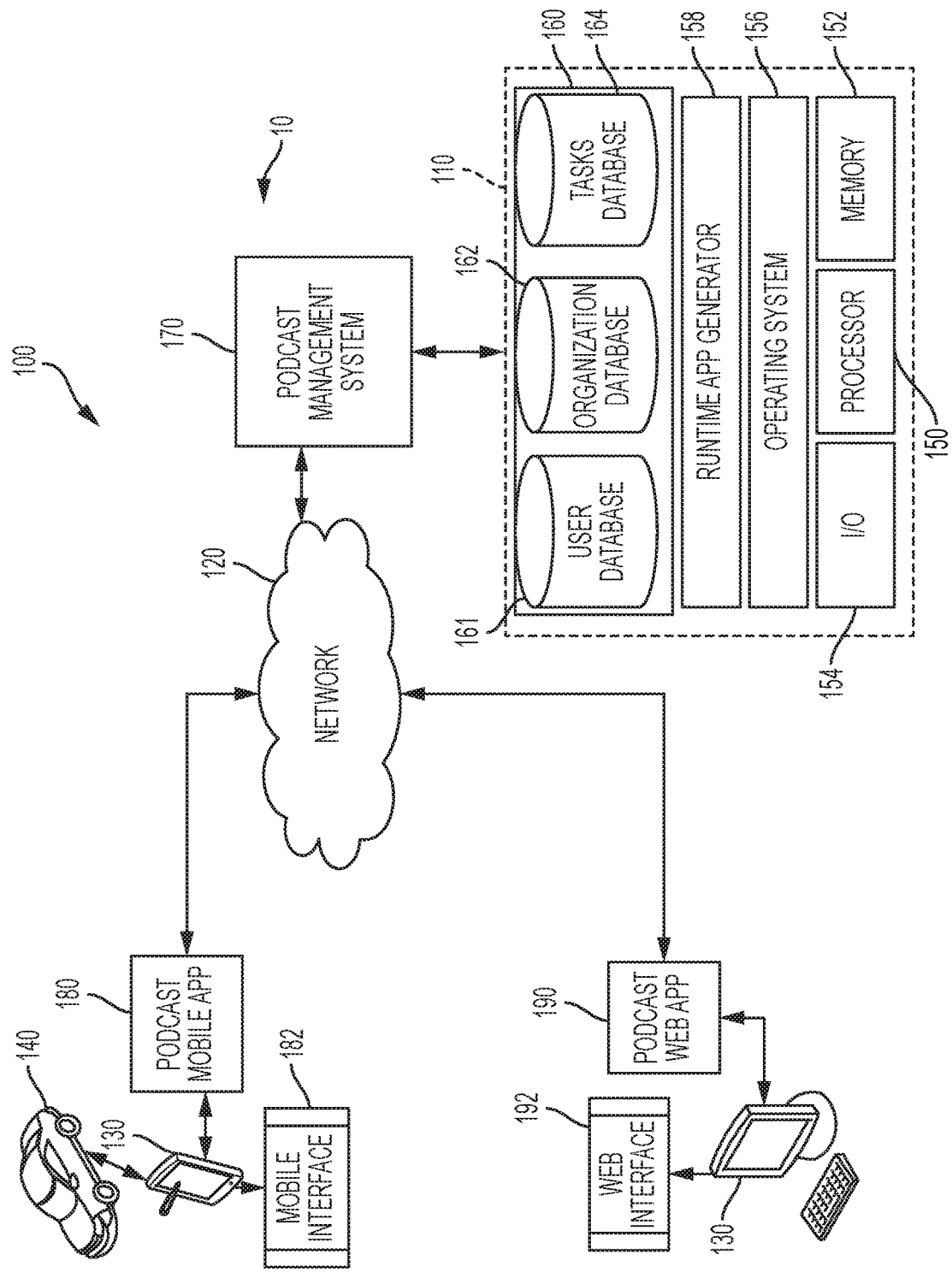
FIG. 1 is a block diagram of an exemplary podcast system that may be implemented in the context of computing environment, in accordance with various embodiments.
Figure 2:
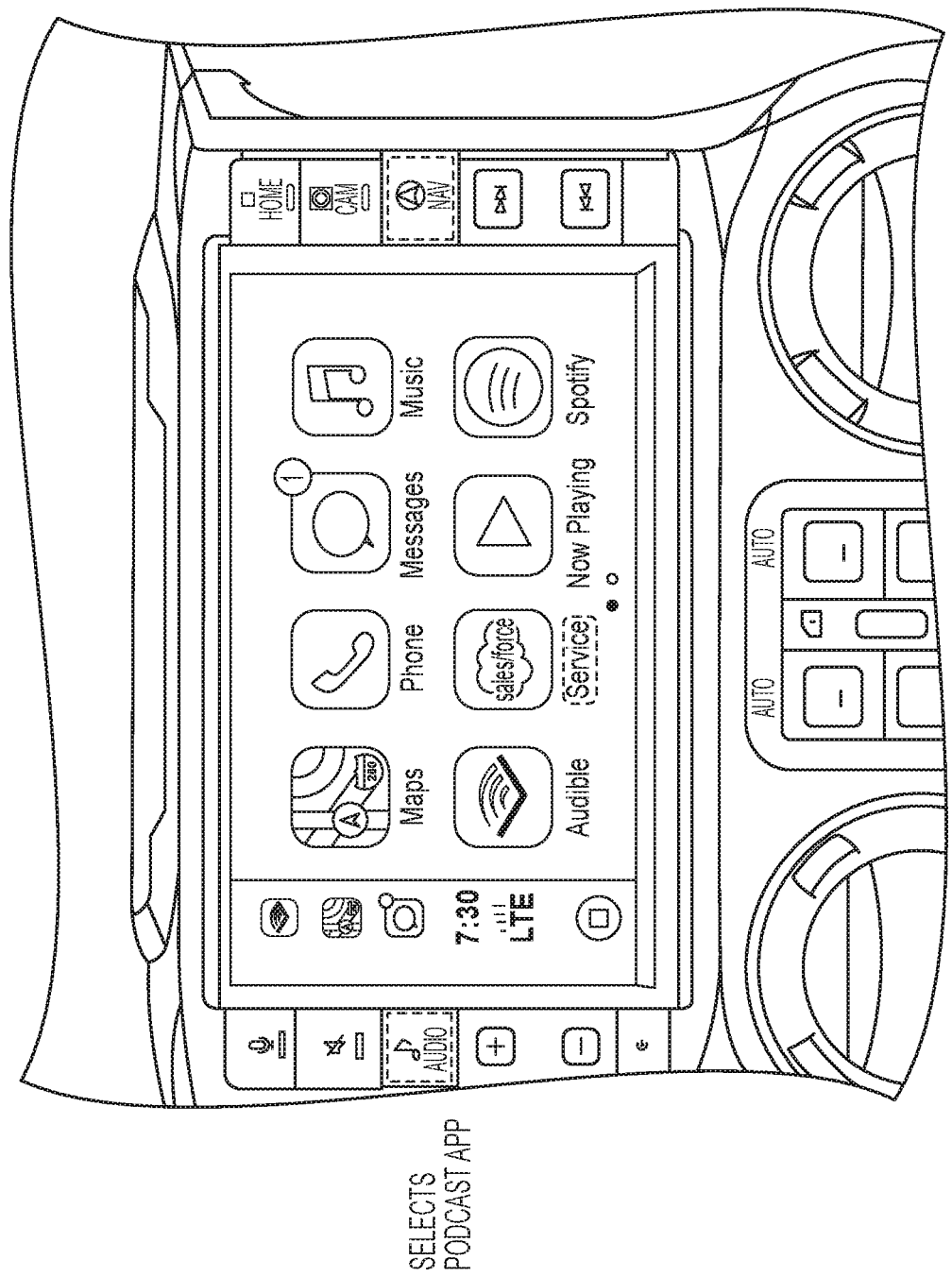
FIGS. 2, 3, 4, and 5 are illustrations of exemplary interfaces that may be generated by an application of the podcast system, in accordance with various embodiments.
Figure 3:
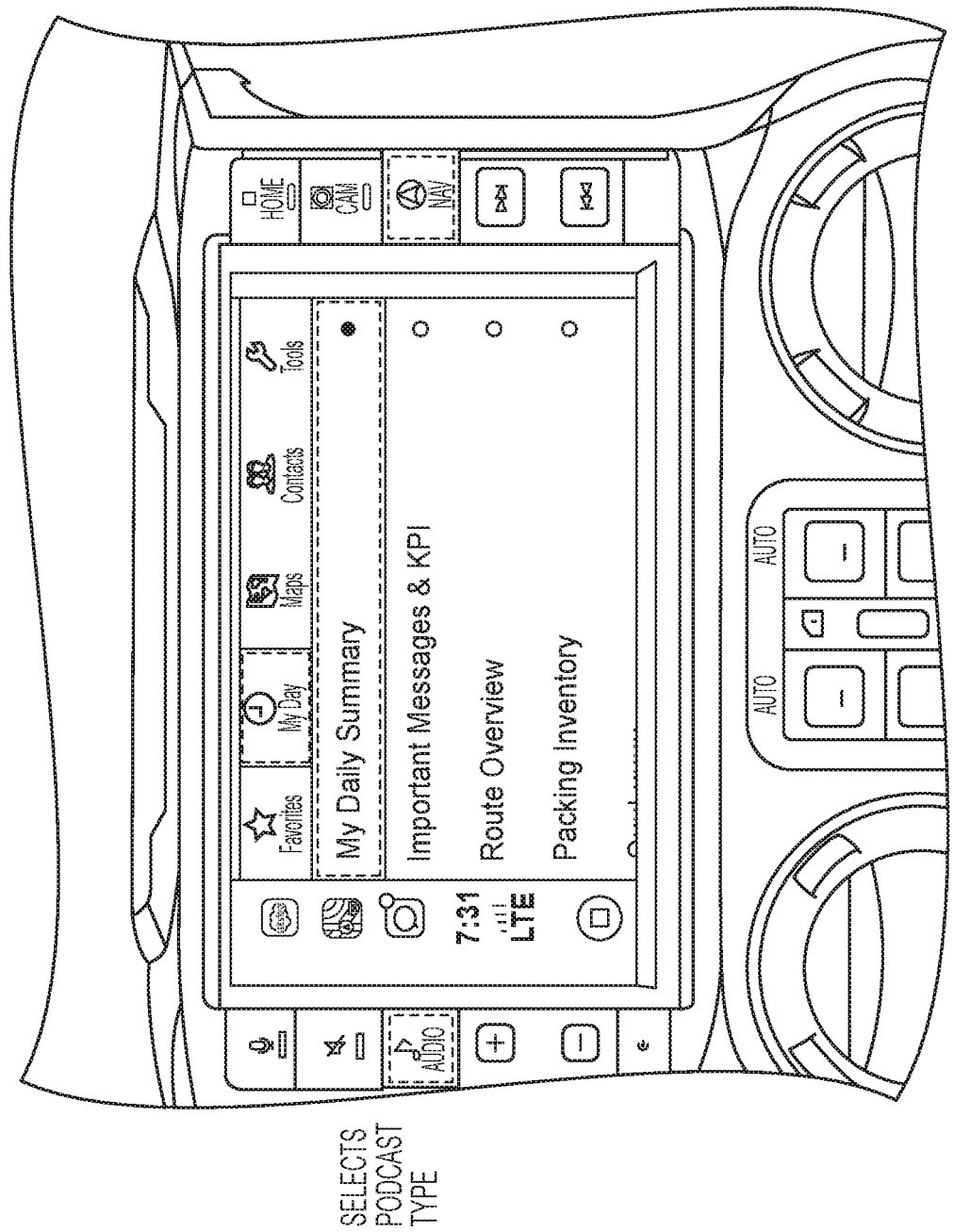
Figure 4:
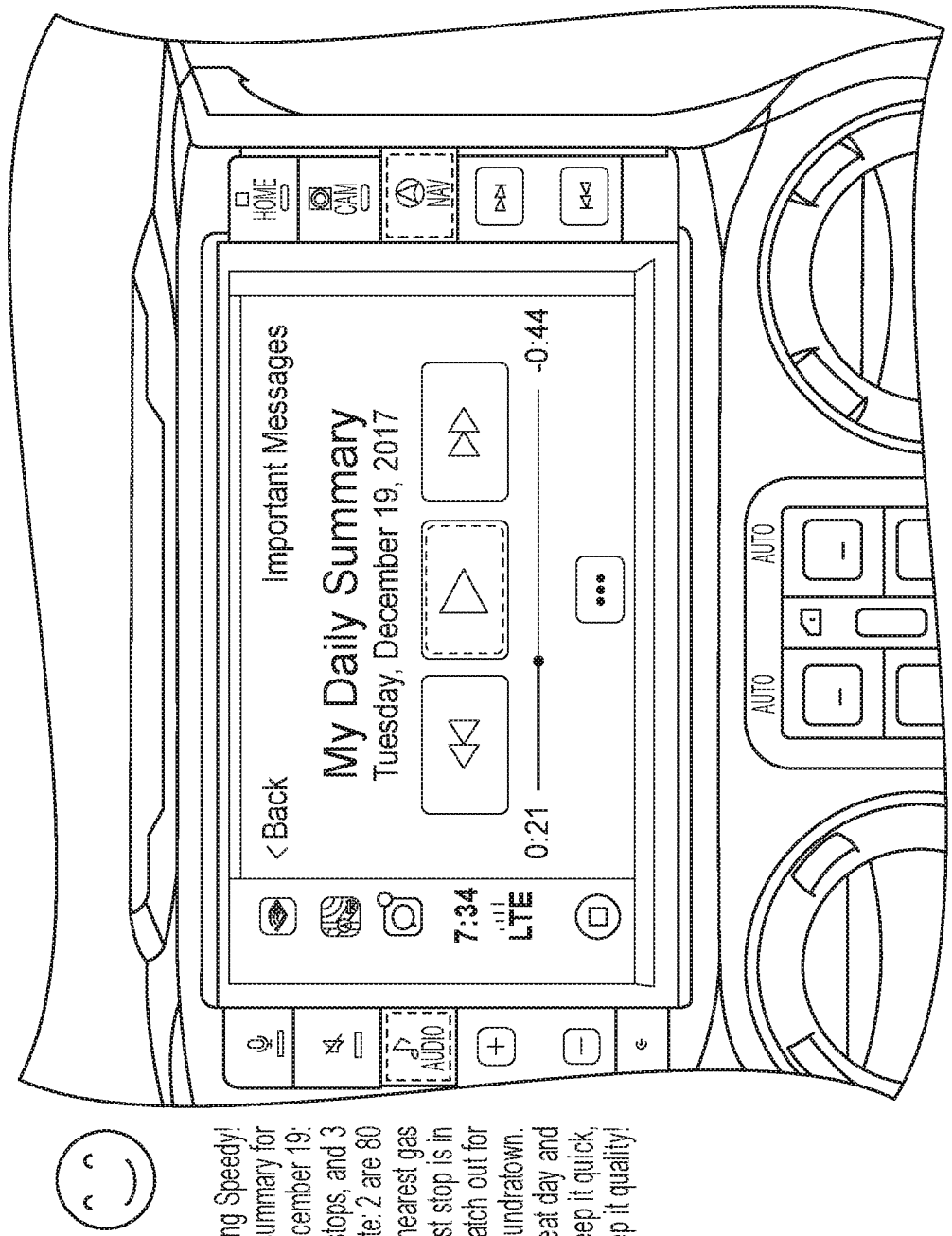

Turning now to the figures where a podcast system 10 is shown and described in accordance with various embodiments. With reference to FIG. 1, in various embodiments, the exemplary podcast system 10 may be implemented in the context of a computing environment 100. The computing environment 100 generally includes a computing system 110 communicatively coupled two one or more client devices 130 via a network 120. The computing system 110 can be any device having a processor and memory. In various embodiments, the computing system 110 is a multi-tenant system. As can be appreciated, the podcast system 10 may be implemented in other systems such as single tenant systems, personal computers, etc. and is not limited to the present example. For exemplary purposes, the podcast system 10 will be discussed in the context of the multi-tenant system 110.

In various embodiments, the multi-tenant system 110 dynamically creates and supports virtual applications based upon data from a common database 160 that is shared between multiple tenants, alternatively referred to herein as a multi-tenant database 160. Data and services generated by the virtual applications are provided via the network 120 to any number of the client devices 130, as desired. Each virtual application is suitably generated at run-time (or on-demand) using a common application platform that securely provides access to data in the multi-tenant database 130 for each of the various tenants subscribing to the multi-tenant system 110.

As used herein, a "tenant" or an "organization" should be understood as referring to a group of one or more users or entities that shares access to common subset of the data within the multi-tenant database 160. In this regard, each tenant includes one or more users associated with, assigned to, or otherwise belonging to that respective tenant. To put it another way, each respective user within the multi-tenant system 110 is associated with, assigned to, or otherwise belongs to a tenant of the plurality of tenants supported by the multi-tenant system 110. Tenants may represent customers, customer departments, business or legal organizations, and/or any other entities that maintain data for sets of users within the multi-tenant system 110 (i.e., in the multi-tenant database 160). Although multiple tenants may share access to the multi-tenant system 110, the data and services provided from the system 110 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data belonging to or otherwise associated with other tenants.

In various embodiments, the multi-tenant system 110 is implemented using one or more actual and/or virtual computing systems that collectively provide a dynamic application platform for generating the virtual applications. For example, the multi-tenant system 110 may be implemented using a cluster of actual and/or virtual servers operating in conjunction with each other, typically in association with conventional network communications, cluster management, load balancing and other features as appropriate. The multi-tenant system 110 operates with any sort of conventional processing hardware, including but not limited to, at least one processor 150, memory 152, an input/output device 154, an operating system 156, an application generator 158, and the common database 160. The input/output device 154 generally represents the interface(s) to networks (e.g., to the network 120, or any other local area, wide area or other network), mass storage, display devices, data entry devices and/or the like. The processor 150 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 152 represents any non-transitory short or long term storage or other computer-readable media capable of storing programming instructions for execution on the processor 150, including any sort of random access memory (RAM), read only memory (ROM), flash memory, magnetic or optical mass storage, and/or the like. The computer-executable programming instructions, when read and executed by the processor 150, cause the processor 150 to create, generate, or otherwise facilitate the virtual applications and perform one or more additional tasks, operations, functions, and/or processes described herein. It should be noted that the memory 152 represents one suitable implementation of such computer-readable media, and alternatively or additionally, the processor 150 could receive and cooperate with external computer-readable media that is realized as a portable or mobile component or application platform, e.g., a portable hard drive, a USB flash drive, an optical disc, or the like.

Still referring to FIG. 1, the data and services provided by the multi-tenant system 110 can be retrieved using any sort of personal computer, mobile telephone, tablet or other network-enabled client device 130 on the network 120. In an exemplary embodiment, the client device 130 includes a display device, such as a monitor, screen, or another conventional electronic display capable of graphically presenting data and/or information retrieved from the multi-tenant database 160. Typically, the user operates a conventional browser application (e.g., in the case of the client device 130 being a computer) or other client program such as an application (e.g., in the case of the client device 130 mobile telephone) executed by the client device 130 to contact the multi-tenant system 110 via the network 120 using a networking protocol, such as the hypertext transport protocol (HTTP) or the like. The user typically authenticates his or her identity to the multi-tenant system 110 to obtain a session identifier ("SessionID") that identifies the user in subsequent communications with the multi-tenant system 110. When the identified user requests access to a virtual application, a runtime application generator 158 suitably creates the application at run time based upon the stored data, as appropriate. As noted above, the virtual application may contain Java, ActiveX, or other content that can be presented using conventional client software running on the client device 130; other embodiments may simply provide dynamic web or other content that can be presented and viewed by the user, as desired.

The multi-tenant database 160 is any sort of repository or other data storage system capable of storing and managing the data associated with any number of tenants. The database 160 may be implemented using any type of conventional database server hardware. In various embodiments, the database 160 shares processing hardware with the multi-tenant system 110. In other embodiments, the database 160 is implemented using separate physical and/or virtual database server hardware that communicates with the multi-tenant system 110 to perform the various functions described herein. In an exemplary embodiment, the database 160 includes a user database 161 that stores user data, an organization database 162 that stores data for each organization or tenant, and a tasks database 164 that stores tasks data associated with the users and/or organizations. In practice, the stored data may be organized and formatted in any manner to support the virtual applications. In various embodiments, the data is suitably organized into a relatively small number of large data tables to maintain a semi-amorphous "heap"-type format. The data can then be organized as needed for a particular virtual application. For example, conventional data relationships can be established using any number of pivot tables that establish indexing, uniqueness, relationships between entities, and/or other aspects of conventional database organization as desired. Further data manipulation and report formatting is generally performed at run-time using a variety of metadata constructs. Metadata within a universal data directory (UDD), for example, can be used to describe any number of forms, reports, workflows, user access privileges, business logic and other constructs that are common to multiple tenants. Tenant-specific formatting, functions and other constructs may be maintained as tenant-specific metadata for each tenant, as desired. Rather than forcing the data into an inflexible global structure that is common to all tenants and applications, the database 160 is organized to be relatively amorphous, with the pivot tables and the metadata providing additional structure on an as-needed basis. To that end, the application platform 110 suitably uses the pivot tables and/or the metadata generate "virtual" components of the virtual applications to logically obtain, process, and present the relatively amorphous data from the database 160.

In various embodiments, the podcast system 10 includes a podcast management system 170 that communicates with a podcast web-based application and/or a mobile application via the network 120. In various embodiments, the podcast management system 170 may be implemented on the multi-tenant system 110, for example, as a virtual application and a part of the database 160. The podcast management system 170 generates dynamic podcast files that are personalized to a user of the system 110. The podcast files are dynamic in that the content is different for each user. For example, the podcast files generally include text and associated audio of a personalized message. The personalized message can include information about the user's daily tasks stored in the task database, information from the organization of the user such as goals, slogans, etc. and stored in the organization database, and other personal information such as name, nickname, etc. stored in the user database. The stored podcast files are then downloaded via the network 120 by the podcast mobile application 180 and/or the web-based application 192 either at scheduled intervals or upon request. In various embodiments, the mobile application 180 may further work with a Carplay application or other projection type application to allow for use in a user's vehicle 140 or other personal device of the user such as a watch, glasses, etc.

Figure 5:
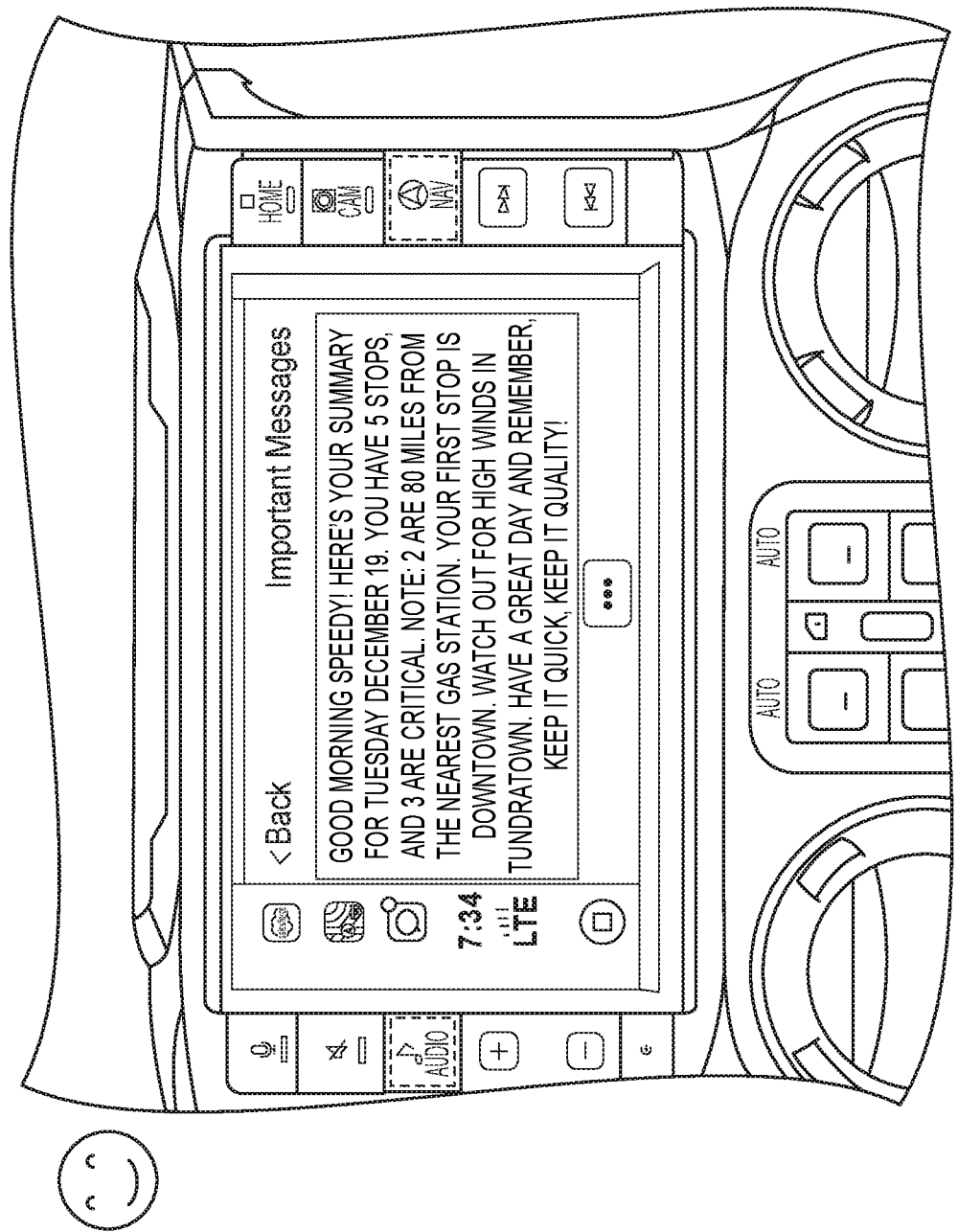

In various embodiments, the personalized podcast files can be accessed by the user via a mobile interface 182 and/or a web-based interface 192 generated by the mobile application 180 and/or the web-based application 190, respectively. For example, as shown in more detail in the exemplary embodiments of FIGS. 2-5, a first screen (FIG. 2) of the interface includes an application icon that, when selected by a user presents a second screen (FIG. 3) having a listing of personalized podcast types (e.g., My Daily Summary, Important Messages & KPI, Route Overview, Packing Inventory, etc.). Each of the podcast types, when selected, cause a third screen (FIG. 3) corresponding to the selected type and having a play icon, a next podcast icon, and a previous icon to be displayed. The icons, when selected, cause a current podcast file, a next podcast file, or a previous podcast file corresponding to the podcast type to be played via an audio device to the user. In various embodiments, the third screen may further have an ellipse icon, that when selected, cause the text version of the currently playing podcast file to be displayed in a fourth screen (FIG. 5). As can be appreciated, FIGS. 2-5 are illustrated as the mobile interface 182 generated by the mobile application 180 and displayed in, for example a vehicle 140 through a Carplay application. As can be appreciated, similar screens can be implemented by the interface 192 generated by the web-based application 190 in various embodiments.

Figure 6:
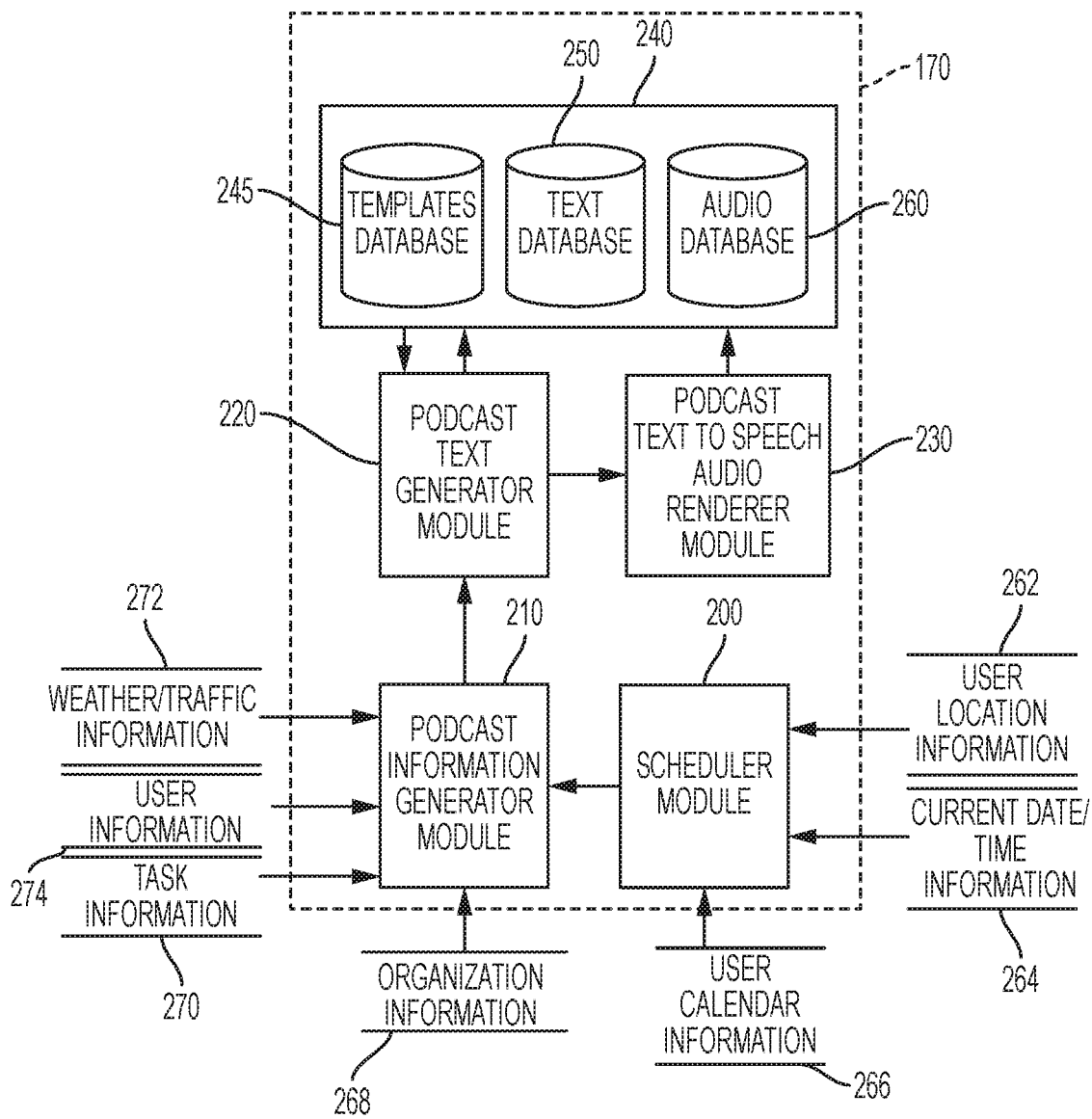
FIG. 6 is a data flow diagram illustrating a podcast management system, in accordance with various embodiments.

With reference now to FIG. 6, a dataflow diagram depicts the podcast management system 170 in more detail in accordance with various embodiments. As can be appreciated, various exemplary embodiments of the podcast management system 170, according to the present disclosure, may include any number of modules and/or sub-modules. In various exemplary embodiments, the modules and sub-modules shown in FIG. 6 may be combined and/or further partitioned to similarly generate personalized podcast files. In various embodiments, the podcast management system 170 includes a scheduler module 200, a podcast information generator module 210, a podcast text generator module 220, a podcast text to speech audio renderer module 230, and a database 240. In various embodiments, the database 240 includes a templates database 245 that stores podcast templates, a text database 250 that stores podcast text files, and an audio database 260 that stores podcast audio files.

In various embodiments, the scheduler module 200 schedules the generation of the podcast files. For example, the scheduler module 200 receives user location information 262, current date and/or time information 264, and user calendar information 266. The scheduler module 200 schedules the generation of podcasts files for a user or for an organization based on the inputs. For example, the scheduler module 200 enables podcast generation for a certain user or group of users when the current date and/or time information 264 indicates that the current data and/or time reaches a defined date/time (i.e., a podcast file is generated every day at 4:30 a.m. for a certain user or group of users, or at some other schedules intervals). In another example, the scheduler module 200 enables podcast generation when the user location information 262 indicates that the current location of the user is at a defined location. In still another example, the scheduler module 200 enables podcast generation when the user location information 262 and/or the current date/time information 264 indicates that the user has reached a calendar item (e.g. time and location). As can be appreciated, other means of scheduling podcast generation can be implemented in various embodiments as the scheduler module 200 is not limited to the present examples.

In various embodiments, the podcast information generator module 210 generates the personal information needed to create the podcast files. For example, the podcast information generator module 210 receives weather and/or traffic information 272, user information 274, task information 270, and/or organization information 268. The information 268-272 can be received from the common database 160 (FIG. 1) and/or other information sources.

When podcast generation is enabled by the scheduler module 200, the podcast information generator module 210 processes the received information to extract certain parameters needed for the generation of the podcast files. The podcast information generator module 210 may further interpret the parameters to provide the details needed for the generation of the podcast files. The podcast information generator module 210 then tags the needed details based on the type of detail (e.g., weather information, traffic information, task information, user information, organization information, etc.) For example, the received weather information and/or traffic information 272 may include a listing of all slow-downs or accidents, closed roads, construction, etc. in the area. The podcast information generator module 210 processes the weather and/or traffic information 272 to extract slow-down parameters and further processes the slow-down parameters associated with locations of tasks of the user's daily schedule to determine relevant traffic information. The relevant traffic information is the detail that is then tagged as [Traffic Information].

Figure 7:
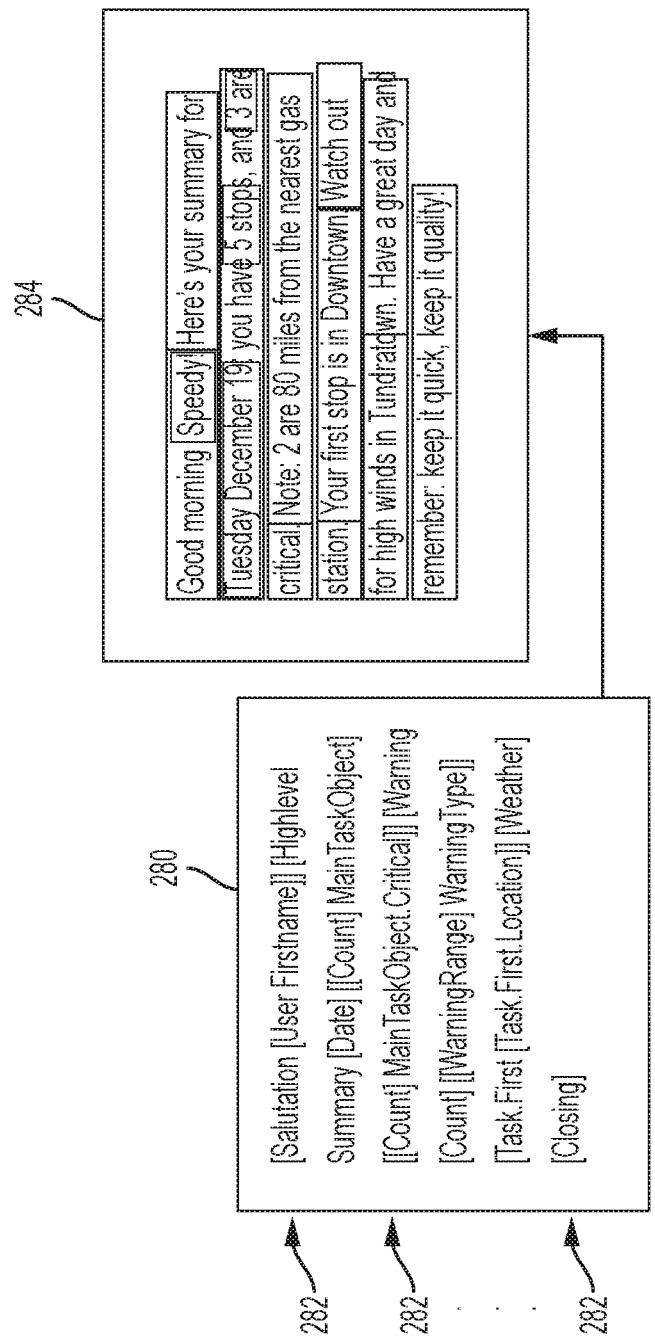
FIG. 7 is an illustration of an exemplary podcast template, in accordance with various embodiments.

The podcast text generator module 220 generates a text message based on the tagged personal information. For example, the podcast text generator module 220 retrieves from the templates database 245 a podcast template for the particular user or organization and populates the retrieved podcast template with the information. For example, as shown FIG. 7, a podcast template 280 may include a series of tags 282 provided in a certain order, the order being reflective of a sentence structure or paragraph. The podcast text generator module 220 matches the tags of the personal information with the tags 282 of the podcast template 280 and populates the tags 282 of the podcast template 280 with the personal information to form a personalized message 284. In various embodiments, the podcast text generator module 220 adds punctuation and/or capitalization as needed to the personalized message 284. The podcast text generator module 220 saves the personalized message 284 as a podcast text file in the text database 250.

The podcast text to speech audio renderer module 230 converts the text message into a spoken message in audio or video format and saves the spoken audio/video as a podcast file in the audio database. The podcast text to speech audio renderer module 230 links the stored podcast file with the stored text file such that they can be downloaded together.

Figure 8:
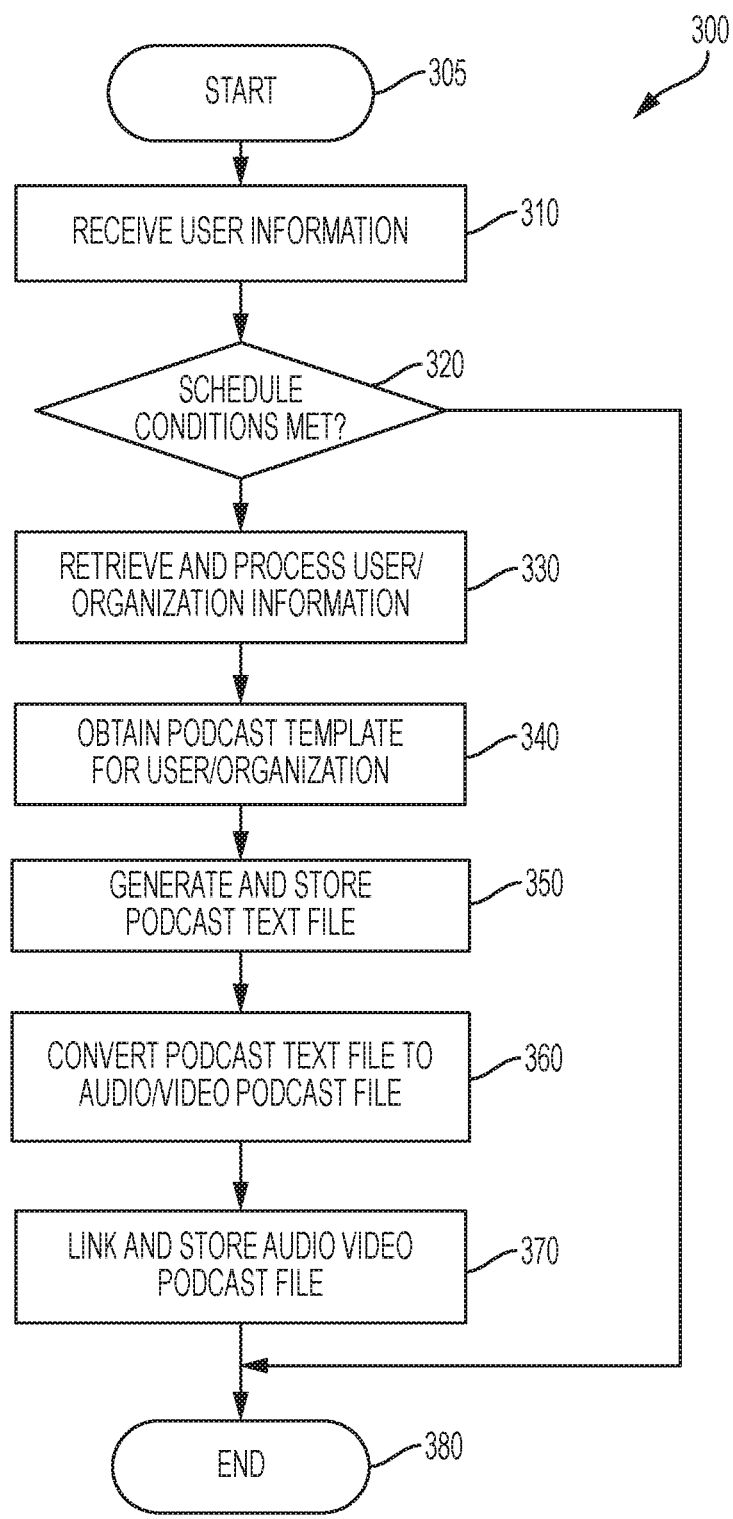
FIGS. 8 and 9 are process flowcharts depicting example processes that may be performed by the podcast system for providing personalized podcasts, in accordance with various embodiments.
Figure 9:
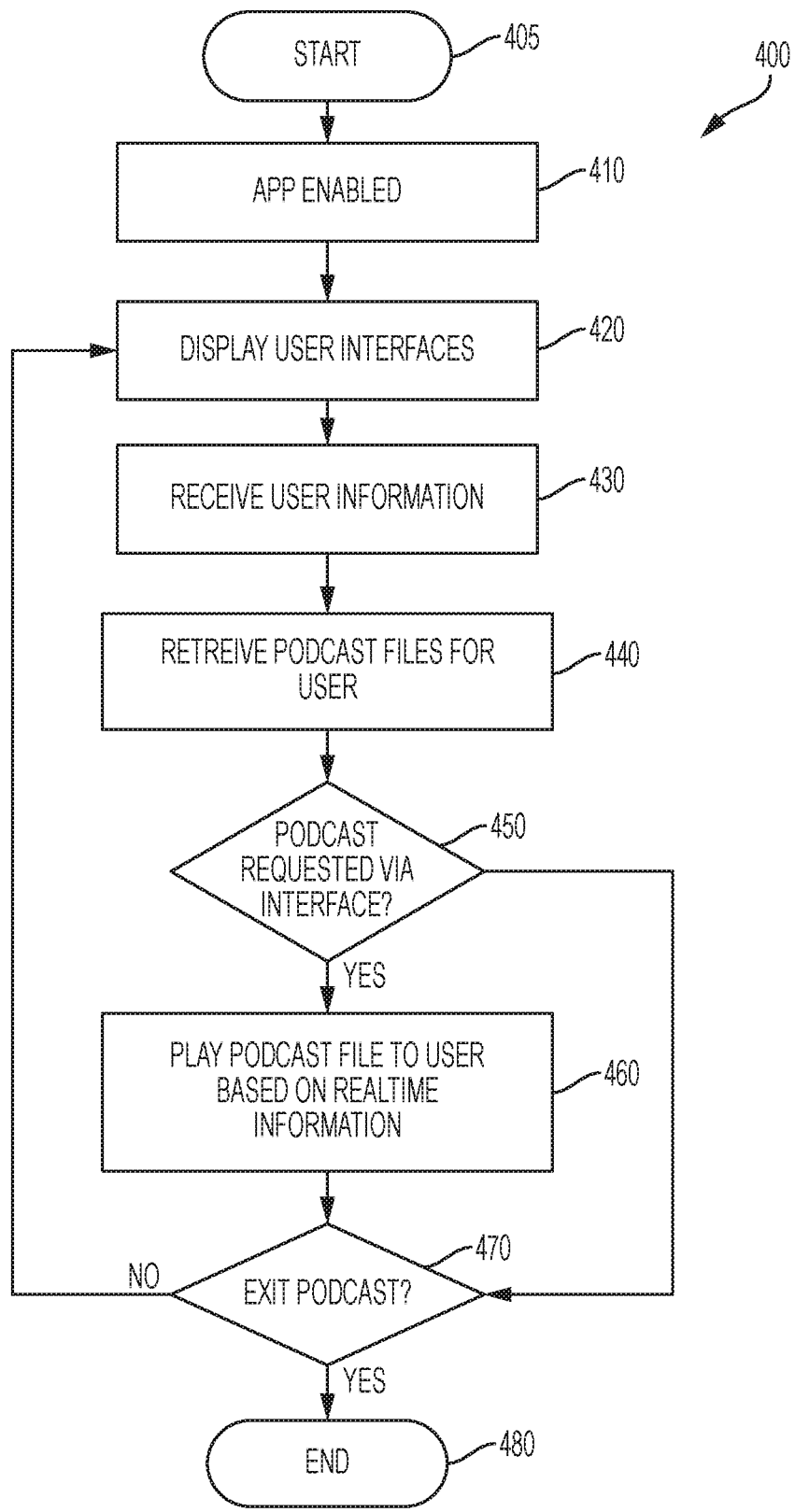

FIGS. 8 and 9 are process flowcharts depicting an example processes 300, 400 for managing personalized podcast files. As can be appreciated in light of the disclosure, the order of operations performed by the processes 300, 400 is not limited to the sequential execution as illustrated in FIGS. 8 and 9, but may be performed in one or more varying orders as applicable and in accordance with the present disclosure. In various embodiments, the processes 300, 400 can be scheduled to run based on one or more predetermined events or run automatically based on an occurrence of one or more events.

In various embodiments, the process 300 is an exemplary process for generating personalized podcast files. The process may begin at 305. At operation 310, user information including location and/or calendar information is received. The user information is processed along with the current date/time to determine whether conditions have been met to schedule podcast generation, for example as discussed with regard to FIG. 6, at operation 320. If conditions have been met at operation 320, user and/or organization information is received and processed to obtain personal information, for example as discussed with regard to FIG. 6, at operation 330. The podcast template associated with the user and/or organization is retrieved and populated with the personal information to produce a personal message, for example as discussed with regard to FIG. 6, and the personal message is stored a podcast text file at operation 340. The podcast text file is then converted into a spoken message, linked to the podcast text file, and saved as an audio/video podcast file at 370. Thereafter the method may end at 380.

In various embodiments, the process 400 is an exemplary process for playing back the podcast files. The process 400 may begin at 405. At operation 410, the application is enabled, for example by selection of the application icon. The user interface for podcast file type is displayed at operation 420. The user selection is received at operation 430. Based on the user selection, the podcast file(s) are retrieved for the user at 440. Once a request to playback the podcast file is received at operation 450, the podcast is played for the user at operation 460. Once a request to exit the podcast application is received at operation 470, the method may end at 480.

As can be appreciated, other processes may be implemented by the systems described herein in various embodiments as the systems are not limited to the exemplary processes shown.

Disclosed herein are systems and methods for providing podcast files. In various embodiments, the apparatus, systems, techniques and articles described can provide personalized podcasts to users of an organization. In one embodiment, a method includes storing, in a template database, a podcast template, wherein the podcast template includes a sentence definition including one or more data tags and a sentence order for a plurality of sentences; storing, in a user database, user information for a plurality of users; generating, by a processor, a podcast text file by selectively populating the podcast template with user information associated with a first user of the plurality of users based on the data tags; converting, by the processor, the podcast text file to a podcast audio file; and storing, by the processor, the podcast text file and the podcast audio file in a podcast database for podcast playback by the first user.

These aspects and other embodiments may include one or more of the following features. In various embodiments, the generating the podcast text file may include: automatically tagging, by a processor, a parameter of the user information with a data tag; matching, by the processor, the data tag of the user information with a data tag of the podcast template; populating, by the processor, the matched data tag of the template with the parameter to form a personal message; and storing, by the processor, the personal message as the podcast text file.

In various embodiments, the generating the podcast text file may include populating the podcast template with real-time weather information. In various embodiments, the method may include storing company information in a database, and wherein the generating the podcast text file further comprises populating the podcast template with company information. In various embodiments, the company information may include at least one of a company slogan and a company goal. In various embodiments, the user information may include daily tasks associated with the first user. In various embodiments, the method may include scheduling the generating the podcast text file based on user calendar information. In various embodiments, the method may include scheduling the generating the podcast text file based on user location information. In various embodiments, the method may include scheduling the generating the podcast text file based on at least one of date and time information. In various embodiments, the method may include providing a user interface of an application for user selection of playback of the podcast text file and the podcast audio file.

In another embodiment, a computer-implemented system for generating podcast files is provided. The system includes: a first database that stores a podcast template associated with at least one of a user and an organization, wherein the podcast template includes a sentence definition including one or more data tags and a sentence order for a plurality of sentences; a second data base that stores user information for a plurality of users; and a processor configured to generate a podcast text file by selectively populating the podcast template with user information associated with a first user of the plurality of users based on the data tags, convert the podcast text file to a podcast audio file, and store the podcast text file and the podcast audio file in a podcast database for podcast playback by the first user.

These aspects and other embodiments may include one or more of the following features. In various embodiments, the processor may be further configured to generate the podcast text file by: automatically tagging a parameter of the user information with a data tag; matching the data tag of the user information with a data tag of the podcast template; populating the matched data tag of the template with the parameter to form a personal message; and storing the personal message as the podcast text file.

In various embodiments, the processor may be further configured to generate the podcast text file by populating the podcast template with realtime weather information. In various embodiments, the processor may be further configured to store company information in a database, and generate the podcast text by populating the podcast template with company information. In various embodiments, the company information includes at least one of a company slogan and a company goal. In various embodiments, the user information includes daily tasks associated with the first user.

In various embodiments, the processor may be further configured to schedule the generation of the podcast text file based on user calendar information and user location information. In various embodiments, the processor may be further configured to schedule the generation of the podcast text file based on at least one of date and time information. In various embodiments, the system may include an application that generates a user interface for user selection of playback of the podcast text file and the podcast audio file.

In still another embodiment, a multi-tenant database system including one or more processors and non-transient computer readable media coupled to the one or more processors, the non-transient computer readable media embodying programming instructions configurable to perform a method. The method includes: storing, in a template database, a podcast template associated with an organization, wherein the podcast template includes a sentence definition including one or more data tags and a sentence order for a plurality of sentences; storing, in a user database, user information for a plurality of users of the organization; generating, by a processor, a podcast text file by selectively populating the podcast template with user information associated with a first user of the plurality of users based on the data tags; converting, by the processor, the podcast text file to a podcast audio file; and storing, by the processor, the podcast text file and the podcast audio file in a podcast database for podcast playback by the first user.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer implemented method for generating podcast files, the method comprising:
    storing, in a template database, a podcast template, wherein the podcast template includes a plurality of data tags provided in a certain order, the order being reflective of a sentence or paragraph structure;
    storing, in a user database, user information for a plurality of users;
    generating, by a processor, a podcast text file by selectively populating the podcast template with user information including a user schedule listing a plurality of tasks associated with a first user of the plurality of users, weather information, traffic information, and organization information based on the data tags, wherein the traffic information includes traffic slowdown parameters associated with locations of tasks of the user schedule;
    converting, by the processor, the podcast text file to a podcast audio file; and
    storing, by the processor, the podcast text file and the podcast audio file in a podcast database for podcast playback by the first user.

2. The method of claim 1, wherein the generating the podcast text file comprises:
    automatically tagging, by a processor, a parameter of the user information with a data tag;
    matching, by the processor, the data tag of the user information with a data tag of the podcast template;
    populating, by the processor, the matched data tag of the template with the parameter to form a personal message; and
    storing, by the processor, the personal message as the podcast text file.

3. The method of claim 1, further comprising storing company information in a database, and wherein the generating the podcast text file further comprises populating the podcast template with the stored company information.

4. The method of claim 3, wherein the company information includes at least one of a company slogan and a company goal.

5. The method of claim 1, further comprising scheduling the generating the podcast text file based on the user schedule.

6. The method of claim 1, further comprising scheduling the generating the podcast text file based on user location information.

7. The method of claim 1, further comprising scheduling the generating the podcast text file based on at least one of date and time information.

8. The method of claim 1, further comprising providing a user interface of an application for user selection of playback of the podcast text file and the podcast audio file.

9. A computer-implemented system for generating podcast files, the system comprising:
- a first database that stores a podcast template associated with at least one of a user and an organization, wherein the podcast template includes a plurality of data tags provided in a certain order, the order being reflective of a sentence or paragraph structure;
- a second database that stores user information for a plurality of users;
- a processor configured to generate a podcast text file by selectively populating the podcast template with user information including a user schedule listing a plurality of tasks associated with a first user of the plurality of users, weather information, traffic information, and organization information based on the data tags, wherein the traffic information includes traffic slowdown parameters associated with locations of tasks of the user schedule, convert the podcast text file to a podcast audio file, and store the podcast text file and the podcast audio file in a podcast database for podcast playback by the first user.

10. The system of claim 9, wherein the processor is further configured to generate the podcast text file by:
- automatically tagging a parameter of the user information with a data tag;
- matching the data tag of the user information with a data tag of the podcast template;
- populating the matched data tag of the template with the parameter to form a personal message; and
- storing the personal message as the podcast text file.

11. The system of claim 9, wherein the processor is further configured to store company information in a database, and generate the podcast text by populating the podcast template with the stored company information.

12. The system of claim 11, wherein the company information includes at least one of a company slogan and a company goal.

13. The system of claim 9, wherein the processor is further configured to schedule the generation of the podcast text file based on user calendar information and user location information.

14. The system of claim 9, wherein the processor is further configured to schedule the generation of the podcast text file based on at least one of date and time information.

15. The system of claim 9, further comprising an application that generates a user interface for user selection of playback of the podcast text file and the podcast audio file.

16. A multi-tenant database system comprising one or more processors and non-transient computer readable media coupled to the one or more processors, the non-transient computer readable media embodying programming instructions configurable to perform a method, the method comprising:
- storing, in a template database, a podcast template associated with an organization, wherein the podcast template includes a plurality of data tags provided in a certain order, the order being reflective of a sentence or paragraph structure;
- storing, in a user database, user information for a plurality of users of the organization;
- generating, by a processor, a podcast text file by selectively populating the podcast template with user information including a user schedule listing a plurality of tasks associated with a first user of the plurality of users, weather information, traffic information, and organization information based on the data tags, wherein the traffic information includes traffic slowdown parameters associated with locations of tasks of the user schedule;
- converting, by the processor, the podcast text file to a podcast audio file; and
- storing, by the processor, the podcast text file and the podcast audio file in a podcast database for podcast playback by the first user.

* * * * *